Feb. 10, 1948.  W. E. SHIVELY  2,435,801
PREROTATION AIRPLANE TIRE AND METHOD OF MAKING IT
Filed Aug. 11, 1944  2 Sheets-Sheet 1
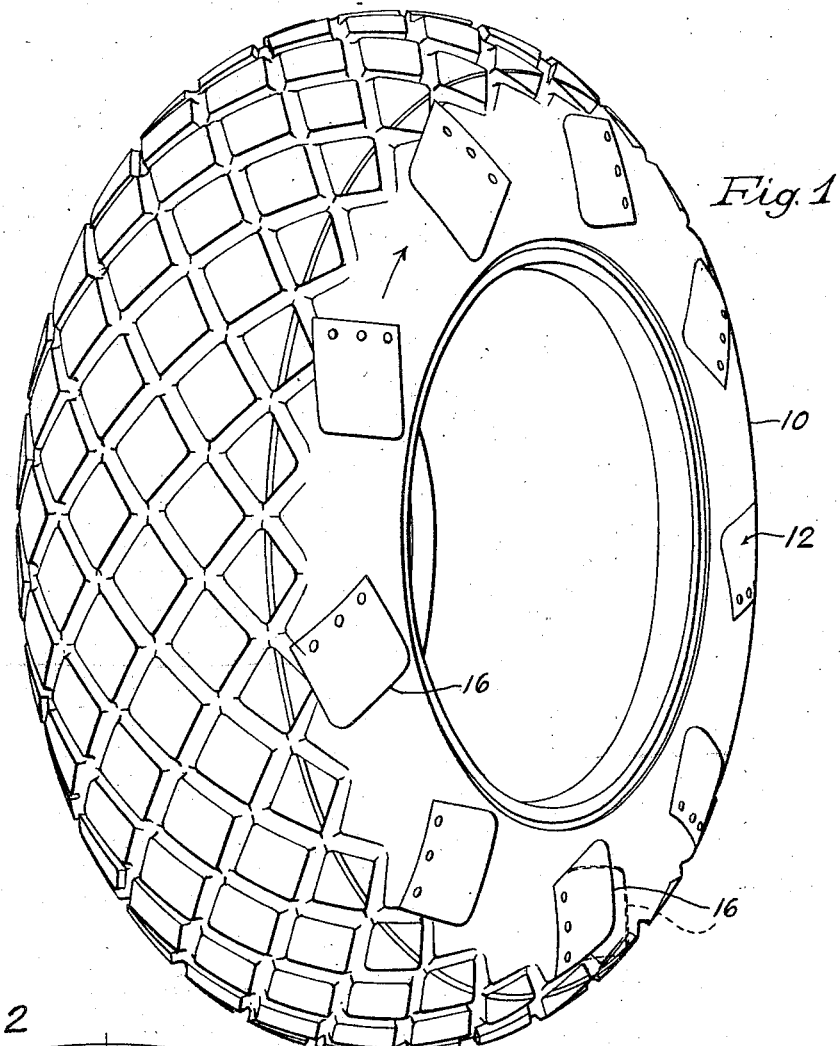
Inventor
Walter E. Shively Feb. 10, 1948. W. E. SHIVELY 2,435,801
PREROTATION AIRPLANE TIRE AND METHOD OF MAKING IT
Filed Aug. 11, 1944 2 Sheets—Sheet 2
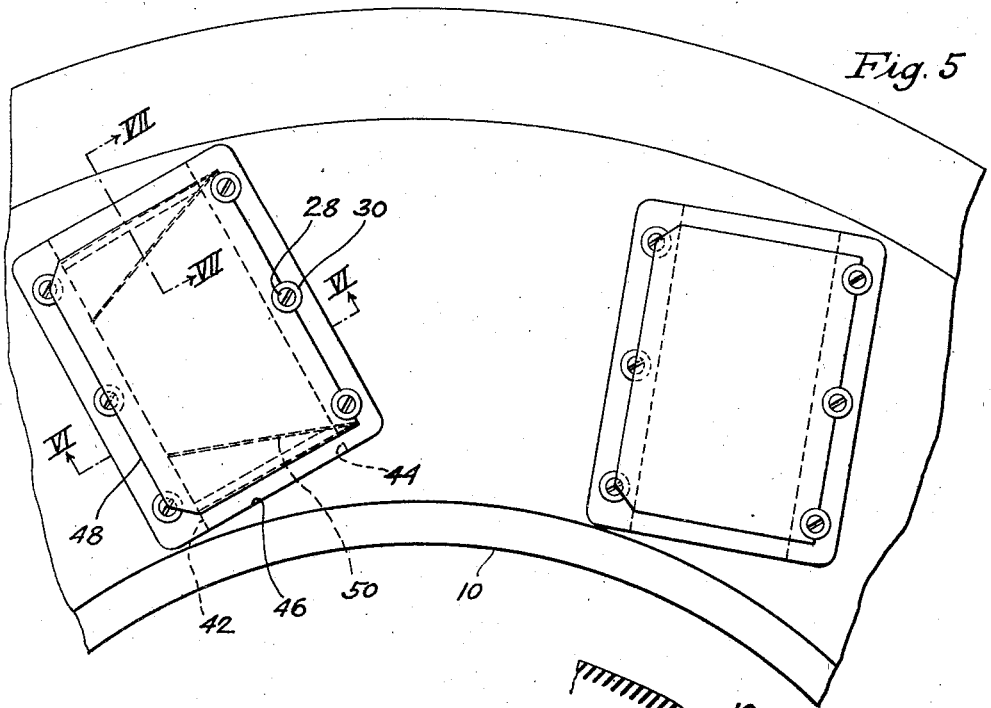
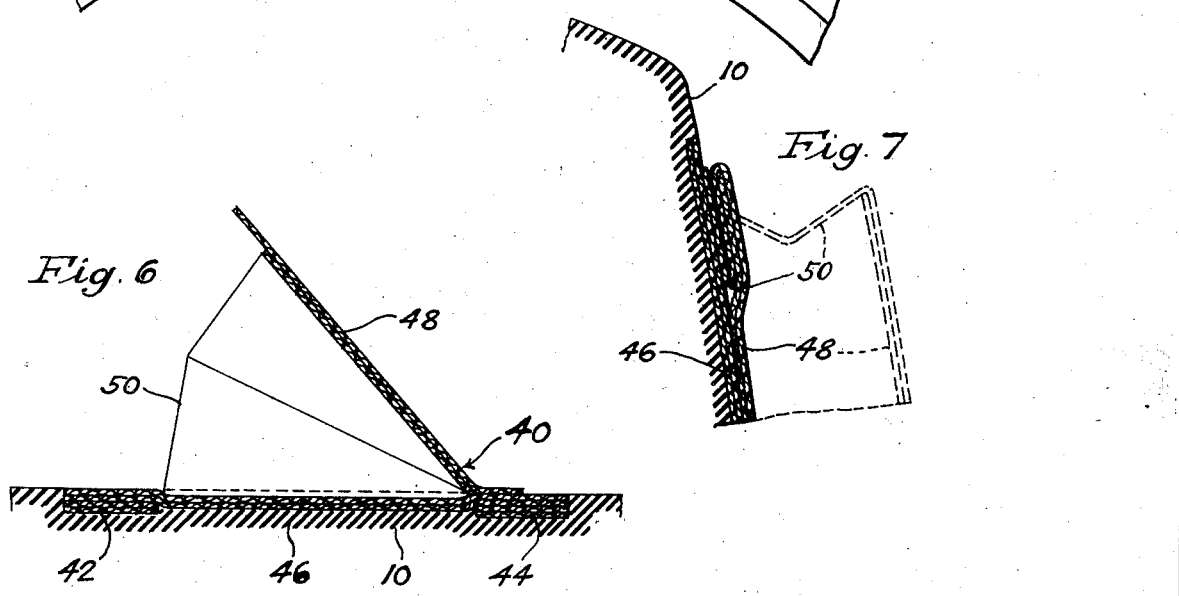
Inventor
Walter E. Shively
By
Attorney Patented Feb. 10, 1948

2,435,801

UNITED STATES PATENT OFFICE 2,435,801

PREROTATION AIRPLANE TIRE AND METHOD OF MAKING IT

Walter E. Shively, Akron, Ohio, assignor to Wingfoot Corporation, Akron, Ohio, a corporation of Delaware Application August 11, 1944, Serial No. 548,952

15 Claims. (Cl. 244—103)

This invention relates to tires for airplane wheels adapted to be rotated previous to a landing, and, in particular, to airflow-driven means attached to the tire to effect rotation of the tire and wheel.

Rubber tires, provided with vanes of the flap and air-scoop type, integrally connected to the sides of the tire for pre-rotating the landing wheels of an airplane, are known. Such vanes are so constructed that they are either of non-deformable shape, or they are made foldable so that they open when in the lower portion of the arc of wheel travel, and close when in the upper portion of the arc of wheel travel. Air vanes, however, when integrally united with the tire, have the disadvantage that their manufacture is more complicated and more expensive, and, in case of injury to the vanes, the making of repairs is rather cumbersome and inconvenient and requires considerable time.

To obviate these conditions is the main object of this invention, which provides a vane type airplane tire wherein the vanes do not form an integral part of the tire but are made detachable so that they can be readily removed and replaced in case one of them becomes damaged.

Another object of this invention is to keep vane type airplane tires simple in construction so that standard tire molds can be employed, without any change, for manufacture.

Another object of this invention is to provide a standard airplane tire with detachable vanes which, in folded condition, are substantially flush with the tire surface.

Another object of this invention is to provide simple means of attachment on the standard tire for detachably securing the air vanes thereto, such means being readily operable to attach or detach the vanes, but, when the vanes are attached, serving to positively secure the vanes to the tire.

The aforesaid objects of the invention and other objects which will become apparent as the description proceeds, are achieved by providing anchor means vulcanized to the tire, to which the detachable vane can be readily fastened by releasable means and just as readily removed for replacement in case of injury. The anchor strip, together with the vane attached to it with a film of non-sticking material therebetween are placed on the green tire in proper position and cured in the tire mold so that only the anchor strip becomes an integral part of the tire and the vane still is removable.

For a better understanding of this invention, reference should be had to the accompanying drawing, wherein Fig. 1 is a perspective drawing of an airplane tire embodying the invention; Fig. 2 is a fragmentary side view of the tire, showing more clearly the relative position of the vanes to a tire diameter; Fig. 3 is a cross-sectional view in larger scale of a vane of the flap type, taken on line III—III of Fig. 2; Fig. 4 is a similar fragmentary view showing a modification of the vane fastening means; Fig. 5 is a similar view to that of Fig. 2 showing a modification thereof; Fig. 6 is a cross-sectional view taken on line VI—VI of Fig. 5; and Fig. 7 is a cross-sectional view taken on line VII—VII of Fig. 5, showing the pocket vane of the modification in open position.

Although the principles of this invention are applicable to various types and shapes of air vanes, the invention will be described only in reference to the examples shown in the drawings.

With specific reference to the forms of the invention illustrated in the drawings, the numeral 10 indicates an airplane tire provided at one or both sides with air vanes, designated as a whole by the numeral 12, of the flap type, consisting of an anchor strip 14 made up of one or more plies, preferably, of rubberized fabric vulcanized permanently to the tire, and of the substantially flat flap type air vane proper 16 also made up of plies of rubberized fabric or equivalent material. The anchor strip 14 has inserted in and secured to it a number of halves 18, usually the male halves, of press buttons and the vane 16 has inserted in it, in aligned positions, a corresponding number of the other halves 20, usually female, of these press buttons which detachably connect the vane with the anchor strip. These buttons are commercially obtainable, and are so made that they open only in one direction and are so inserted in the anchor strip that the vane cannot be pulled off from the anchor strip when acted upon by the air forces. In order to pull the button parts apart, the vane must be pulled in a direction opposite to the direction in which the air force opens it. Instead of employing press buttons, the anchor strip 14 may be provided with flange nuts 26 (Fig. 4) having their flanges placed on the inside thereof, and to which the vane is fastened by countersunk screws 28 and washers 30. This screw connection, however, may assume various forms. Of course, instead of the fastening means for the vane, described above, other fastening means like Tinnerman fasteners or the like may be used. Also, the vanes may be secured by screwing or riveting, or in other known ways to the tire directly.

Again, the anchoring means may be riveted, molded, or otherwise fastened to the tire, as will be evident to those skilled in the art.

Before assembling the vanes with the green or uncured tire, a film of non-sticking holland cloth 38 extending over the vane all around is inserted between the vane and the anchor strip and both parts are then fastened together by one or more of the described fastening means to form a unit, whereupon the anchor strip is cemented in the desired position to the tire. During vulcanization of the tire in its mold the vane assembly is pressed completely into the tire surface so that it will be substantially flush therewith after the tire is cured and finished. The anchor strip then forms an integral part of the tire, whereas the vane proper can be readily removed due to the fact that the film of holland permits its separation from the tire, or free pivotal movement of the vane about the hinge provided by the buttons and into or out of the recess in the side of the tire formed by the vane during the vulcanization.

A modification of the above described flap vane is illustrated by Figs. 5 to 7, in which is shown a folding pocket type vane 40, designated as a whole, made preferably of one or more plies of rubberized fabric. The pocket flap includes two anchor strips 42 and 44 for securing the pocket vane proper, which consists of a base 46 and of a folding pocket portion 48 which, at opposite sides, has extending folds 50. One edge of each fold 50 is cemented to the base 46. The base 46 is detachably connected to the anchor strips 42 and 44 by any suitable means, such as described above and shown in Figs. 3 and 4. In making the tire, the pocket assembly is attached to and cured together with the tire as similarly described for the flap vane, by inserting films or layers of holland cloth between all walls, which are separable, and to prevent their vulcanizing together during the curing process of the tire. Also, in this case, the pocket vane will be in folded condition substantially flush with the side walls of the tire after curing, and no special tire molds providing space for the vanes will be necessary.

It will be evident from the above description that the problem of providing an airplane tire with detachable air vanes for pre-rotation of the landing wheel has been solved by this invention in a satisfactory way by using standard tire molds and by avoiding expensive tire repair jobs due to damaged vanes. According to this invention, such vanes are instantly replaceable and tire repairs due to such cause are entirely eliminated.

The constructions shown in the drawings do not entirely exhaust the idea of the invention, inasmuch as the shape and form of both types of vanes may vary to a considerable extent to achieve the greatest efficiency.

While in accordance with the patent statutes two embodiments of the invention have been illustrated and described in detail, it is to be particularly understood that the invention is not limited thereto and thereby, but that the inventive scope is defined in the appended claims.

I claim:

1. In combination with a rubber tire of an airplane landing wheel, a plurality of individual, self-contained air vanes, and separable fastening means detachably connecting said air vanes to at least one side of said tire in a position to rotate the tire from the flow of air thereover during flight.

2. In combination with a rubber tire of an airplane landing wheel, a plurality of detachable air vanes at at least one side of the tire, anchor means secured to said tire, and separable fastening means for detachably connecting said air vanes to said anchor means, said anchor means and said air vanes being substantially made of plies of rubberized fabric.

3. In combination with a rubber tire of an airplane landing wheel, a plurality of detachable and foldable air vanes at at least one side of the tire, anchor means for said air vanes on said tire, and separable fastening means for detachably connecting said air vanes to said anchor means.

4. In combination with a rubber tire of an airplane landing wheel, a plurality of detachable and foldable air vanes at at least one side of the tire, anchor means for said air vanes secured to said tire, and separable fastening means for detachably connecting said air vanes to said anchor means, said air vanes being in folded condition substantially flush with the surface of the tire.

5. In combination with a rubber tire of an airplane landing wheel, a plurality of detachable and foldable air vanes at at least one side of the tire, anchor means for said air vanes vulcanized to said tire, one-way press button halves inserted in said anchor means, and complementary halves inserted in said air vanes for attaching said air vanes to said anchor means.

6. In combination with a rubber tire of an airplane landing wheel, a plurality of detachable and foldable air vanes at at least one side of the tire, anchor means for said air vanes vulcanized to said tire, threaded means inserted in said anchor means, and screws connecting said air vanes to said anchor means.

7. In combination with a rubber tire of an airplane landing wheel, a plurality of detachable air vanes of the flap type at at least one side of the tire, anchor means vulcanized to said tire, and separable fastening means for detachably connecting said air vanes to said anchor means.

8. In combination with a rubber tire of an airplane landing wheel, a plurality of detachable air vanes of the flap type, substantially rectangular in shape, at at least one side of the tire, anchor means vulcanized to said tire, and separable fastening means for detachably connecting said air vanes to said anchor means.

9. In combination with a rubber tire of an airplane landing wheel, a plurality of detachable air vanes of the pocket type at at least one side of the tire, anchor means vulcanized to said tire, and separable fastening means for detachably connecting said air vanes to said anchor means.

10. In combination with a rubber tire of an airplane landing wheel, a plurality of detachable air vanes of the pocket type, substantially rectangular in shape, at at least one side of the tire, anchor means vulcanized to said tire, and separable fastening means for detachably connecting said air vanes to said anchor means.

11. In combination with a rubber tire of an airplane landing wheel, a plurality of flap type detachable air vanes substantially rectangular in shape at at least one side of the tire, an anchor strip made of plies of rubberized fabric provided with fastening means for said vanes and integrally united with the tire, and corresponding fastening means in one side of said flap locking with said first fastening means and being detachable therefrom in one direction only to prevent the flap from being torn loose by the air stream.

12. In combination with a rubber tire of an airplane landing wheel, a plurality of detachable air vanes of substantially rectangular shape, of the pocket type, at least two anchor strips made of plies of rubberized fabric and having threaded means inserted therein, a pocket made of plies of rubberized fabric consisting of a substantially rectangular base portion and of a substantially rectangular portion capable of being flapped and provided with folds at opposite sides and being cemented at one side and at the edges of the folds to said base portion, and screws connecting said pocket to said anchor strips, said pocket being in folded condition substantially flush with the surface of the tire.

13. The method of making tires for airplane wheels having detachable and foldable vanes for pre-rotating the wheel by the air flow, consisting of the steps providing an anchor strip made preferably of plies of rubberized fabric and having inserted therein halves of press buttons, providing a flap also made of plies of rubberized fabric and having inserted therein the corresponding other halves of said press buttons, laying a film of holland of all around larger size than said flap between said flap and said anchor strip, and locking said press buttons detachable only in opposite direction to the airflow, cementing the anchor strip with its free face in the desired position to the unvulcanized tire, and curing the whole assembly in a standard tire mold, whereby the anchor strip is made an integral part of the tire, and the flap, then flush with the outer surface of the tire, can be readily detached therefrom and the non-sticking holland film removed.

14. The method of making tires for airplane wheels having detachable and foldable vanes for pre-rotating the wheels by the airflow consisting of the steps providing anchor means for the vanes, both made of flexible material, placing the vane on the anchor means with a ply of holland between each other to prevent their sticking together, cementing the anchor means in proper relative position on the uncured tire, and putting the tire into a standard mold to be cured therein, thereby making the anchor means an integral part of the tire, and the entire vane assembly being substantially flush with the surface of the tire, with the flap readily detachable therefrom.

15. The method of making tires for airplane wheels having detachable and foldable vanes for pre-rotating the wheels by the air flow, consisting of the steps of assembling anchor means and a vane by inserting a film of non-sticking material therebetween and detachably locking said anchor means, cementing the free face of said anchor means to the side of an uncured tire, curing the tire in a tire mold, thereby uniting the anchor means integrally with the tire, and pressing the vane assembly into the surface of the tire and substantially flush therewith, with the vane readily separable from the tire for operation purposes.

WALTER E. SHIVELY.

REFERENCES CITED

The following references are of record in the file of this patent:

UNITED STATES PATENTS

| Number | Name | Date |
| --- | --- | --- |
| 1,287,429 | Price | Dec. 10, 1918 |
| 1,833,019 | Faucher | Nov. 24, 1931 |
| 2,305,237 | Carpenter | Dec. 15, 1942 |
| 2,312,159 | Gulotta | Feb. 23, 1943 |
| 2,333,447 | Schippel | Nov. 2, 1943 |
| 2,411,668 | Pavey | Nov. 26, 1946 |
| 2,412,033 | Crosby | Dec. 3, 1946 |

FOREIGN PATENTS

| Number | Country | Date |
| --- | --- | --- |
| 516,738 | Great Britain | Jan. 10, 1940 |